Feb. 20, 1962 C. G. HEDÉN 3,022,229
CULTIVATION PLANT
Filed Jan. 23, 1958 6 Sheets-Sheet 2

Inventor
Carl-Göran Hedén
by Sommers+Young
Attorneys

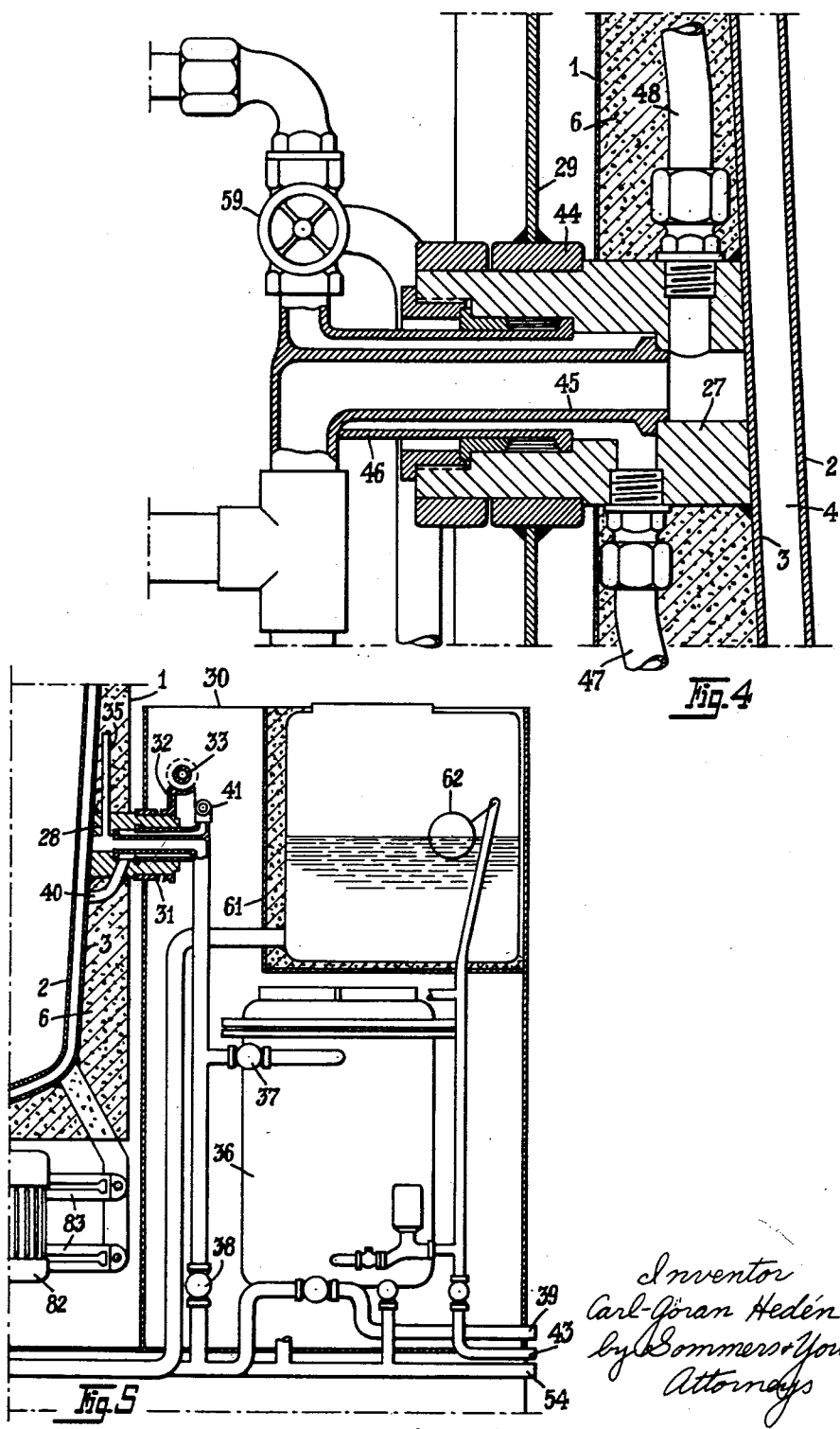

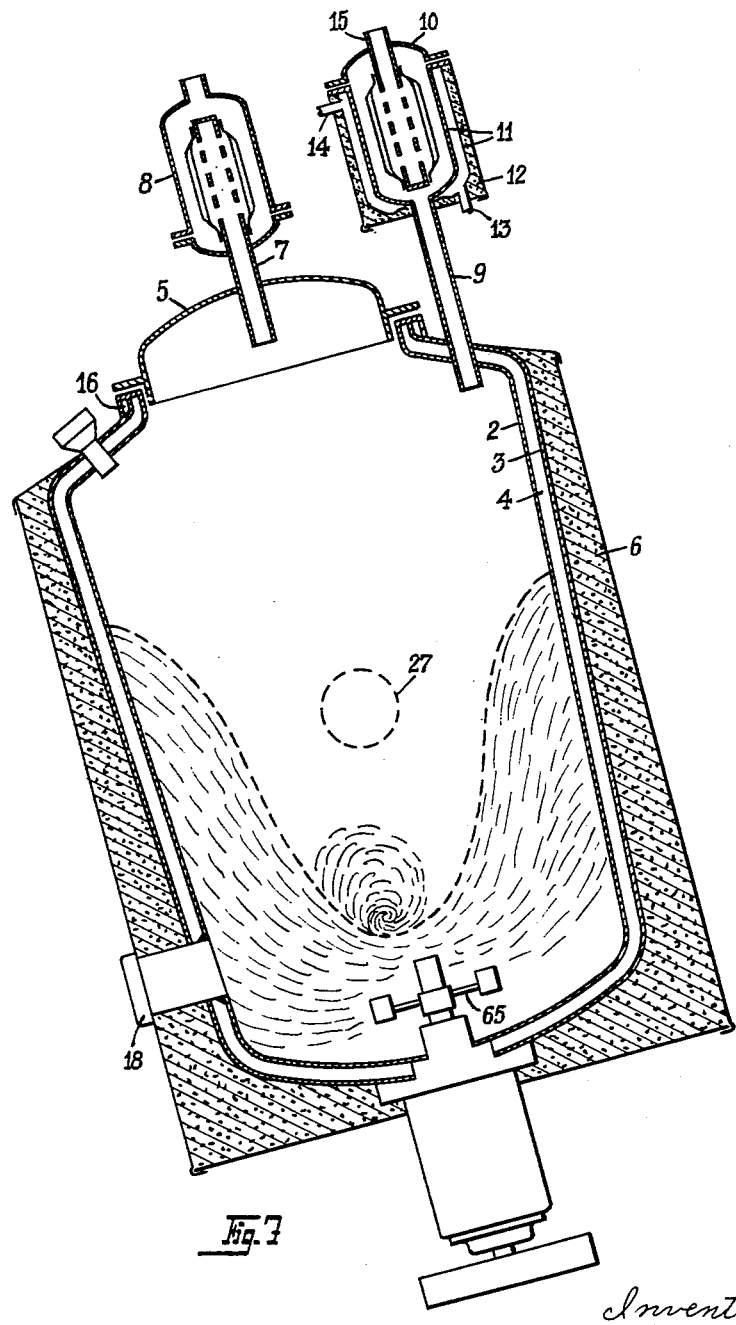

United States Patent Office 3,022,229
Patented Feb. 20, 1962

3,022,229
CULTIVATION PLANT
Carl Göran Hedén, Stockholm, Sweden, assignor to Getinge Mekaniska Verkstads Aktiebolag, Getinge, Sweden
Filed Jan. 23, 1958, Ser. No. 710,744
Claims priority, application Sweden Apr. 1, 1957
11 Claims. (Cl. 195—142)

The invention relates to an improved cultivation plant for sterile cultivation of organisms, such as animals, plants and microorganisms.

For the cultivation of microorganisms, such as bacteria, industries and research laboratories have used apparatus and methods of different kinds, which have been dependent on such factors as the kind of the organisms and the conditions under which they live and the demand for safety against contamination, such as the transfer to the personnel of bacteria when cultivating bacteria causing illness and the transfer to the culture of microorganisms which would spoil the grown culture. As a rule fixed growing tanks with bottom outlet are used. For heating the culture medium warm water is circulated either between double walls of the tank forming a hollow casing or through a winding pipe within the tank, and air is usually forced down into the nutritive fluid or medium, usually bouillon, to which a certain culture of microorganisms is supplied.

These fixed growing tanks or fermentors have several disadvantages. Thus it may be laborious to remove the cover which often is big and heavy. Cleaning of the tank from above after removal of the cover is troublesome. Air inlets, air outlets and other accessories on the upper portion of the tank may be difficult of access for inspection and repair. As the bacteria can grow out through the most air-tight valves and joints the bottom valve and other joints require special arrangements for a sterile closing. For the inspection of the culture it is desirous to provide inspection windows in the wall of the tank, but as the liquid level in the tank may vary from time to time, the position of the level of the liquid relative to the window may be unsuitable, if the tank is stationary. It is therefore desirable to have the possibility of varying the position of the window relative to the liquid surface for rendering it possible to carry out the best observations above and below the liquid surface. Also for sample-extracting through an opening in the wall it is of advantage, if the opening could be adjusted to a desired distance above the liquid surface.

It is an object of the invention to provide a cultivation plant with improved properties over the stationary tank referred to above. Other objects of the invention are to provide a cultivation plant which can be used for various purposes and under varying conditions, by means of which the growing conditions may be regulated within wide limits, and which operates safely.

These and other more specific objects and advantages of the invention will appear from the following specification and the accompanying drawings, in which:

FIGURE 4 is a more detailed sectional view of the left supporting device of the tank according to FIGURE 1.

FIGURE 5 is a sectional view of the portion shown to the right in FIGURE 1.

FIGURE 7 is a sectional view of the tank.

Figure 1:
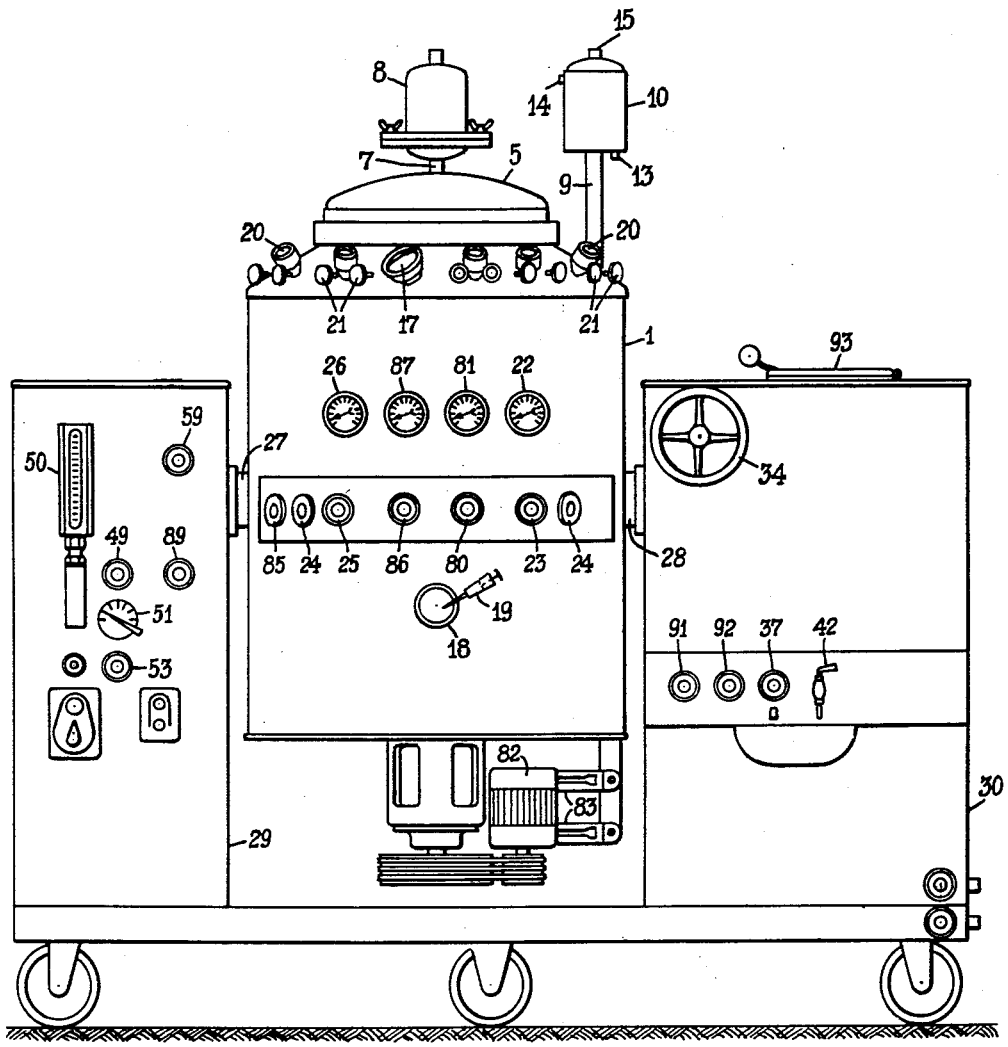
FIGURE 1 is a front elevation of a cultivation plant according to one form of the invention.

The tank 1 has a double-jacketed casing comprising an inner casing 2 and an outer casing 3 of stainless sheet iron forming a hollow space 4 for circulating warm water, cold water, or steam. The inner casing 2 forms a surface of revolution, preferably a cone widening upwards, and around the outer casing 3 a layer of heat insulation 6 and a mantle are provided. A cover 5 (FIG. 7) is secured to the tank, and a pipe 7 passing through the cover has a closed upper end but is provided with lateral openings covered by a filter layer and serving as an air inlet. The end of the pipe is enclosed in a casing 8 with an inlet opening. Another pipe 9 serving as an air outlet passes through the upper portion or shoulder of the tank and has its upper end connected to a casing 10 with double side walls 11 surrounded by an insulation mantle 12. The hollow space between the walls is provided with a steam inlet 13 and a steam outlet 14. The interior of the casing 10 communicates with the air through a pipe 15 with closed lower end and lateral openings covered by a filter layer. By steam heating of the casing 10 the filter layer is kept at such a high temperature that condensation of moisture is counteracted and the filter remains dry and effective.

Figure 6:
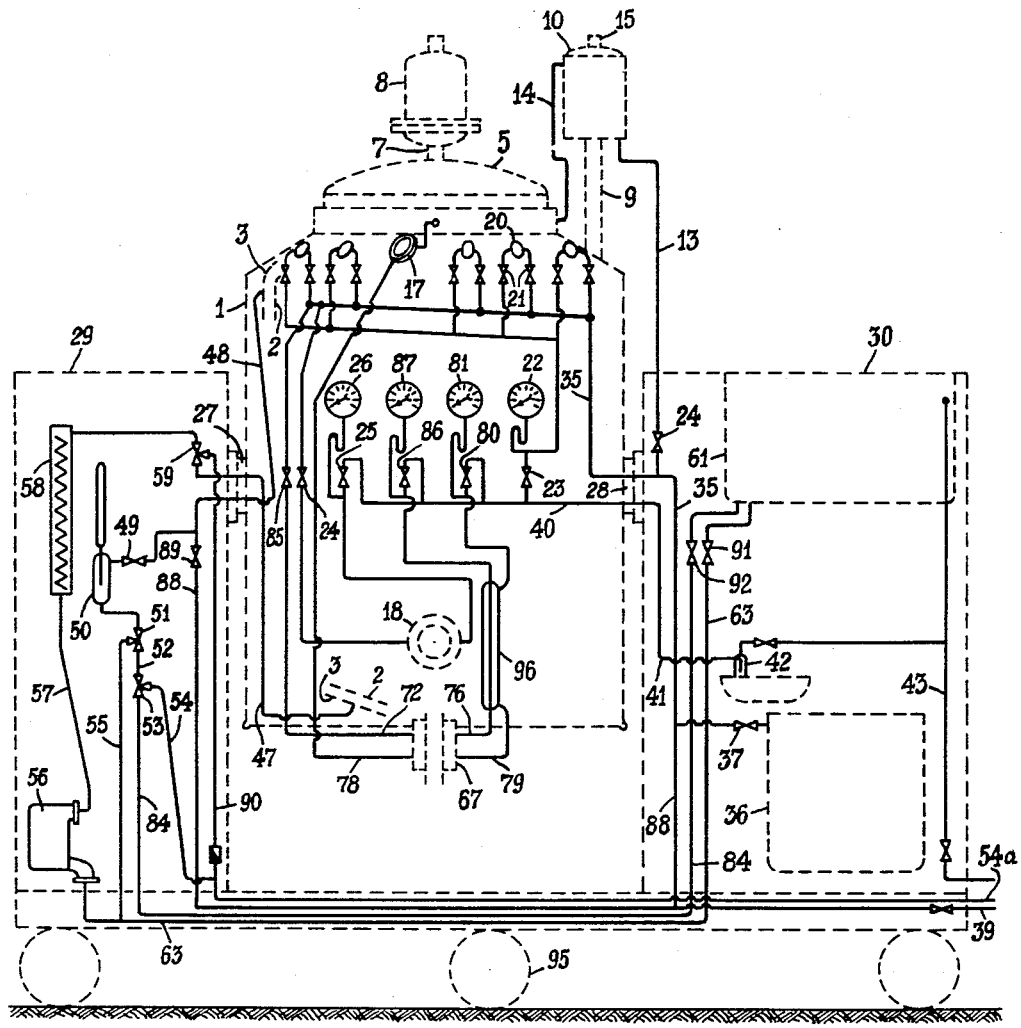
FIGURE 6 is a diagram showing the various pipe connections.

The cover 5 (FIGS. 1 and 6) is hermetically pressed against the upper edge of the tank by means of wing nuts not shown, and a steam channel 16 extends along the contact surface for heating and sterilizing the same. The upper portion of the tank is provided with one or more observation windows 17, and the lower portion has a sampling opening 18 closed by a self-sealing rubber membrane, which may be pierced by a special sampling instrument 19, and as the instrument is taken out the pierced hole closes effectively. In order to sterilize the pierced holes and the edge joint a room outside the membrane is closed by a sealing and removable glass plate and is subjected to a steam pressure. The upper portion of the tank is further provided with five sterile couplings 20 to which rubber hoses, fixed gloves or the like may be secured for different purposes, such as inoculation, sampling, introducing of electrodes, a specially designed optical densitometer or the like. Also these couplings are equipped with a sterilizing steam channel which may be disconnected by cocks 21 in the connection pipes. The steam pressure in all sterile couplings may be read on a common manometer 22 (FIG. 6), if a cock 23 to the common return pipe 40 is closed. Through a pipe with a cock 24 steam may pass via the room outside the sampling opening 18 to a cock 25 and further to the condensate pipe 41, and if the cock 25 is closed the steam pressure may be read on the manometer 26.

The tank 1 is by means of two opposite trunnions 27, 28 rotatably mounted in bearings 44, 31 provided in two standards or cupboards 29, 30. The trunnion 28 (FIG. 5) is journalled in a fixed bearing 31 and provided with a toothed segment 32 engaged by a screw 33 with a hand wheel 34 for tilting the tank to any desired angle of inclination. The trunnion has an axial bore for a stationary pipe bearing with its inner end against a shoulder in the bore so that a tight connection is obtained to a pipe 35 communicating with the bore, whereas the outer end is connected with an electric steam generator 36 by means of a pipe with a cock 37 or alternatively with a separate steam pipe 39 by means of a branch pipe with a cock 38. The steam thus supplied through the trunnion is to be used for sterilizing purposes as described in connection with FIGURE 6, whereafter the return steam and the condensation are conducted through a pipe 40, a ring-shaped channel in the trunnion 28 and a pipe 41 to a cold water tap 42 connected with a cold water supply pipe 43.

The other trunnion 27 (FIGS. 4 and 6) is in a similar way rotatably mounted in a bearing 44 secured to the standard 29 and is provided with an axial bore, in which a stationary pipe 45 is introduced and sealed against a shoulder in the bore. The pipe is provided with an outer concentric tube 46 for forming an intermediate axial channel. The inner end of this channel is connected to a pipe 47 extending within the insulating layer 6 to the lower portion of the hollow space 4 in the casing for the supply of warm water or escape of sterilizing steam, whereas the inner end of pipe 45 through a pipe 48 in the insulating layer communicates with the upper portion of the hollow space 4 for the discharge of warm water or supply of steam. The discharged warm water passes through a cock 49 (FIG. 6) and the casing of a contact thermometer 50 to a three-way cock 51, from which the water may be conducted either through a pipe 52, a three-way cock 53 and a pipe 54 to an outlet or through pipe 55 to a pump 56. From this the water is forced through pipe 57, an electric heating apparatus 58, a three-way cock 59, pipe 46 in the pivot and to the lower portion of the hollow casing. The contact thermometer controls an electronic relay 60, which regulates the electric power in the heating apparatus 58 for maintaining a constant growing temperature of the water, such as 37° C., with a very narrow margin. In case of endothermic processes in the tank this temperature regulation is sufficient, but in case of exothermic processes the tank requires cooling instead of heating to maintain the desired temperature. For this and other purposes which will be described hereinafter a container 61 with cold water is provided in the right standard 30, to which container water is supplied from a cold water pipe 43 to a certain level, which is defined by a float valve 62. The container 61 is connected by pipe 63 to the pump 56, so that the circulating warm water can be mixed with the cold water. The quantity of supplied cold water can be regulated by adjustment of the three-way cock 51, so that a major part of the warm return water is conducted through pipe 55 to the pump whereas the remaining less part is conducted through pipe 52, cock 53, pipe 54 to an outlet 54a. For obtaining an accurate regulation of the desired water temperature, however, the heating apparatus 58 is still in operation.

Figure 2:
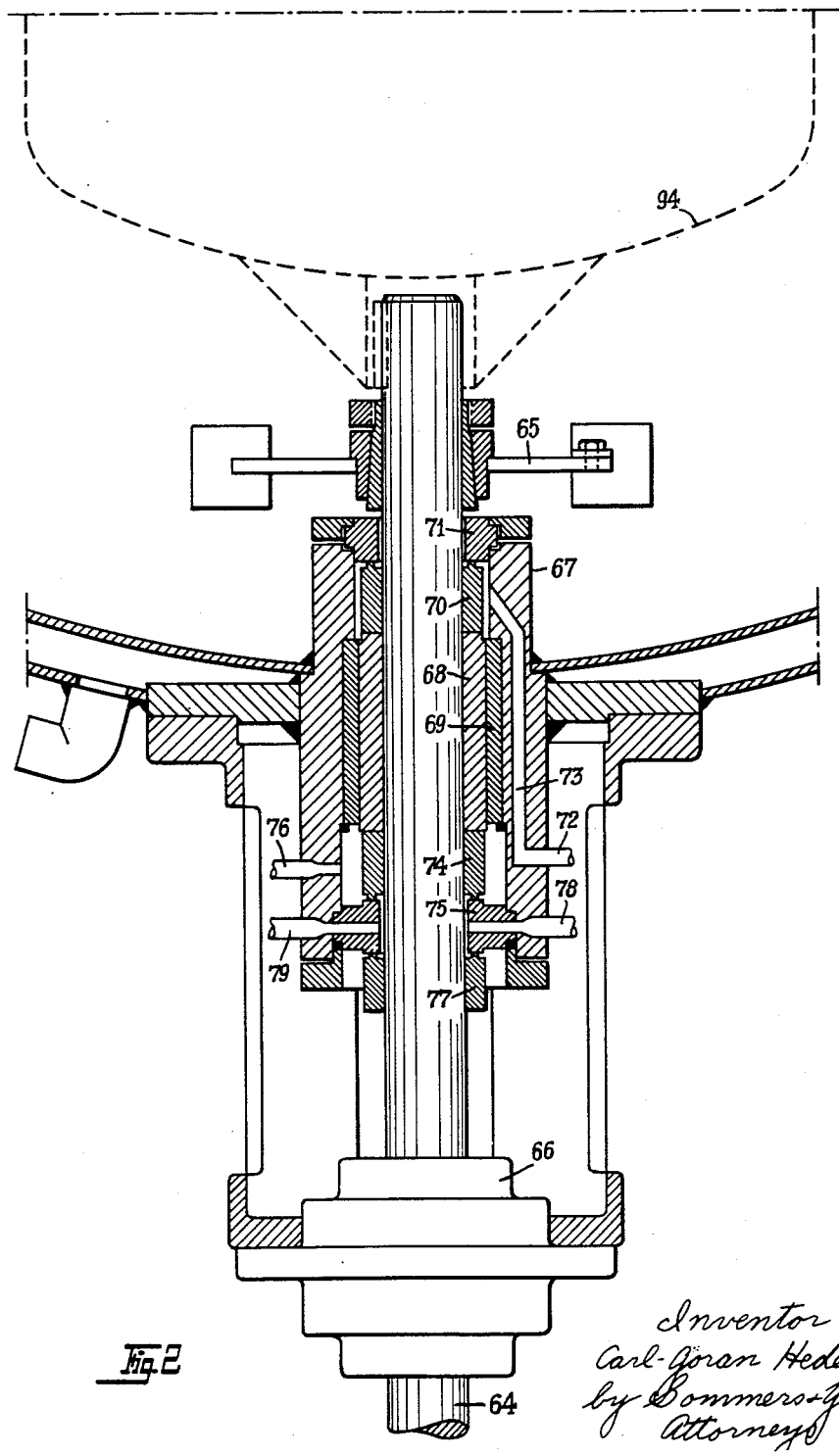
FIGURE 2 is a partial vertical section of the lower portion of the tank.
Figure 3:
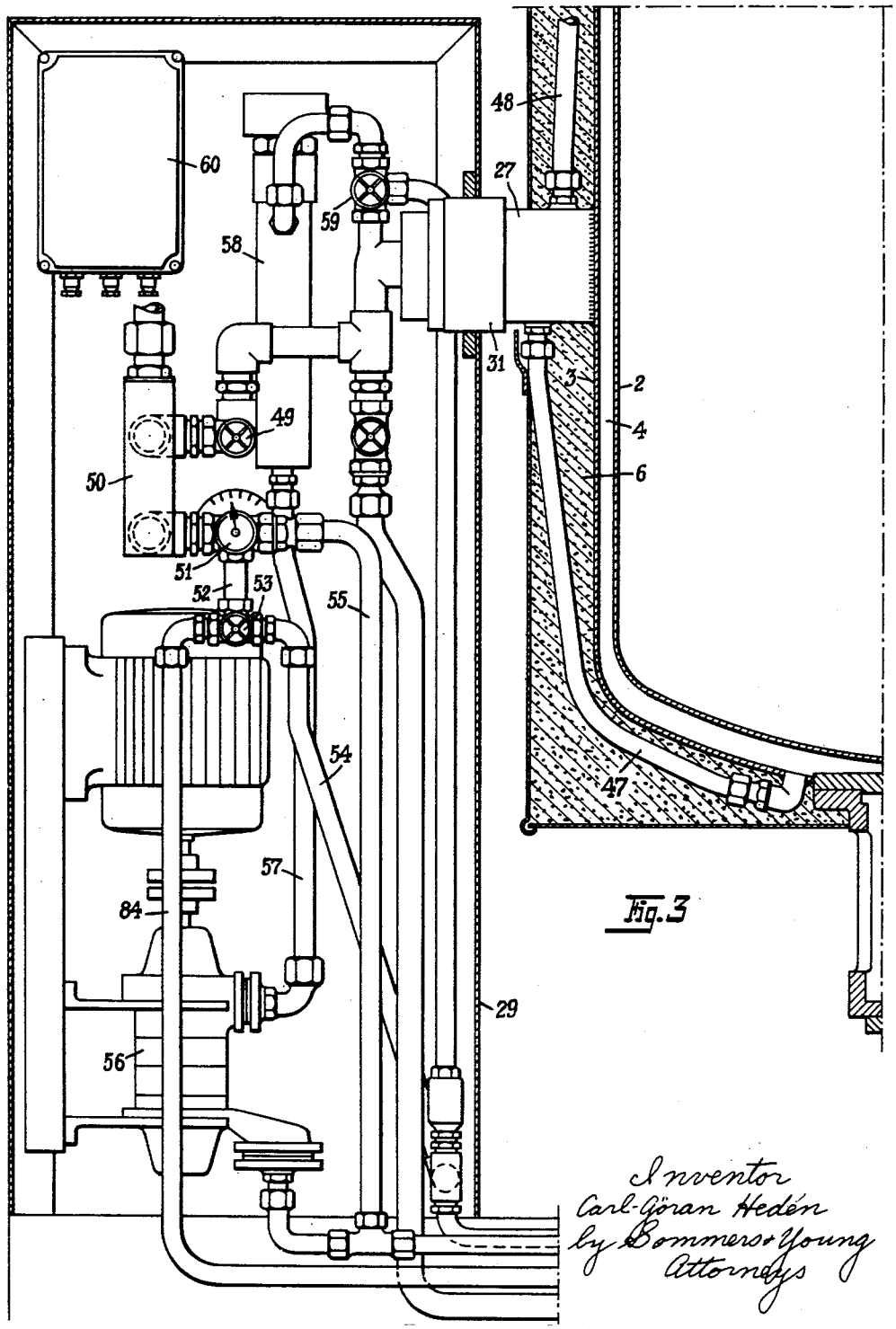
FIGURE 3 is an elevation, partly in section, of the left portion of the plant shown in FIGURE 1.

For an effective growing of microorganisms it is of essential importance that the airing of the culture liquid is accurately adjusted, and that the air is uniformly distributed within the whole liquid. According to the invention this may be attained by setting the liquid in a rotary motion and adjustment of the angle of inclination of the tank, as will now be described with reference to FIGURES 2 and 7.

A rotatable spindle 64 extends through the bottom of the tank, and the upper end of the spindle is provided with a stirrer 65 for imparting a rotary motion to the liquid. The spindle is pivoted in a lower ball bearing 66 and in an upper slide bearing with a housing 67. To the spindle is fastened a sleeve 68 rotating in a bearing shell 69. One end of a Teflon sealing ring 70 abuts the sleeve 68, and the other end is pressed against a press ring 71. A ring-shaped space is formed between the sealing ring 70 and the housing 67, and steam may be supplied through a pipe 72 and an axial channel 73 in the housing to said space. Steam and condensate may flow from the space between the bearing surfaces or grooves therein to a lower, ring-shaped channel formed between the housing and a similar sealing ring 74 resting with its upper end against the sleeve 68 and with its lower end against a press ring 75. This ring-shaped channel is connected with the condensate discharge pipe 41 through a pipe 76 passing a closed heat exchange tube 96 to a cock 86, and if this cock is closed the steam pressure can be read on a manometer 87. To the pipe 72 steam can be supplied by opening a cock 85 connected with the steam pipe 35. Before using the tank sterilizing steam is in this way supplied to the upper portion of the bearing. The press ring 75 and the spindle 64 form an intermediate ring-shaped channel which is closed by a sealing ring 77 on the spindle. Sterilizing steam passes from the steam pipe 35 at first through pipe 13 and the air inlet 9 and from there through the channel around the cover 5 through the observation window 17 and further through pipe 78, the lower portion of bearing 67, the pipe 79, the tube 96 and the cock 80 to the condensate pipe 41, and on closing this cock the pressure can be read on the manometer 81.

The spindle 64 is driven by an electric motor 82 mounted on slide rails 83 which are supported by a frame portion secured directly to the outer casing 3.

When the stirrer imparts a rotary motion to the culture liquid the liquid is pressed by the centrifugal force up against the wall of the tank, which is promoted by the conical and upwards widening form of the wall, and if the axis of the tank is vertical the liquid surface forms a regular surface of revolution. If the axis is inclined as shown in FIG. 7, the liquid surface will be irregular. As a result thereof the liquid at the bottom will be rolled so as to form foam. This foam as well as air caught by the stirrer in case the stirrer is not located entirely below the liquid surface will be introduced into and distributed equally within the liquid, and this airing may be regulated by adjustment of the inclination of the tank by means of the hand wheel 34.

In case the grown culture is to be stored in the tank it is advantageous to rapidly cool the tank. For this purpose the warm water is first to be removed which is performed by adjustment of the cocks 51 and 53 for draining off the water through the outlet pipe 54a. The tank is thereafter to be cooled by means of cooled water from the container 61. From this container the water is conducted through pipe 63 to the pump 56, pipe 55 being closed by cock 51, and further through the heating apparatus 58, the current supply being switched off, through cock 59 and pipe 47 to the bottom of the hollow casing. The water is hereafter returned from the upper portion of the casing through pipe 48, pipe 45 in the pivot, cock 49, contact thermometer 50, cock 51, pipe 52, cock 53, pipe 84 to the cold water container 61.

The culture tank described above operates in the following manner, provided the water in the tank is removed after prior use of the tank. The current to the steam generator is switched on, and the generated steam is automatically regulated in a known manner to maintain a constant pressure, such as 1 atmosphere gauge corresponding to 120° C. The cover is removed and the culture liquid, such as bouillon or sugar solution, is poured into the tank to a certain level, whereafter the cover is screwed on and the motor is started. The whole tank with its content is now to be sterilized by steam heating of all joints and boiling of the culture liquid. For sterilizing of the joints the cocks 24, 23, 80, 86, 25, 24, 85 and all cocks 21 are opened. For the sterilizing of the inner casing of the tank and boiling of the culture liquid a cock 89 is opened, whereby steam passes from the steam generator through pipe 88, cock 89, the cock 49 being closed, and further through pivot 27 and pipe 48 to the upper portion of the casing. The steam is discharged from the lower portion of the casing through pipe 47, trunnion 27 and cock 59 adjusted to pass the steam through pipe 90 to the outlet 54a. The heating of the liquid is accelerated by the enlarged contact surface between the liquid and the casing owing to the circulation of the liquid.

When the sterilizing and boiling operation continued a sufficient time the cocks 89 and 59 are closed whereby the steam supply to the casing is shut off. As the sterilizing of the upper portion of the bearing 67 during normal operation is not desired with respect to the heat emission, the cocks 85 and 86 are closed. The liquid is now to be cooled to the growth temperature by the aid of cold water from the container 61. For this purpose cocks 91, 92 are opened, the other cocks are adjusted as described and the pump is started for circulation of the cold water through the casing. As the desired temperature is reached the cocks 91, 92 are closed and the current to the electric heating apparatus 58 is switched on, whereafter the cocks are adjusted for circulation of warm water of the constant growth temperature.

The culture of bacteria is now introduced into the tank, which thereafter is inclined by means of the wheel 34 to a position, where the desired airing is obtained which may be observed through the observation window 17. When the growth process is completed, the culture liquid is to be cooled. The electric current to the heating apparatus is then switched off and the cocks are adjusted for circulation of cold water from container 61 by means of the pump. Cooling should be carried on to a temperature as near 0° C. as possible, and for this purpose pieces of ice may be introduced into the container 61 through an opening with a shutter 93. When the cooling is completed, the culture liquid may be stored in the tank or discharged through an opening 20 and a rubber tube by tilting the tank.

If by any reason a leakage should arise in the upper part of the bearing 67 to which the sterilizing steam has been shut off, the bacteria will be rendered innocuous in the steam-heated space within the press ring 75, and if they pass through pipe 72 they will reach the steam-heated portion thereof in the tube 96.

The tank according to the invention may with advantage be utilized also for sterile works of different kinds after removal of the stirrer. As an example it is thus possible to introduce sterilized hens' eggs into the tank and hatch chicks, which are kept on sterilized food for the investigation of the influence of special bacteria without interference by other bacteria.

The device described and shown in the drawing may be modified in different respects without departure from the principle of the invention. If it is desired to grow bacteria or tissue-cells in a smaller quantity of cultivation liquid, a special container 94 may be fixed on the spindle 64 in FIGURE 2 and rotated with the inclined spindle, whereby a film of liquid is formed on the wall for airing the culture liquid, and a speedy rotation is in this case not necessary. Instead of the use of an electric steam boiler 36 the steam may be supplied from a pipe 39. The tank may further be provided with transport-wheels for moving the device to a desired place. The tank may also be provided with a special cover with openings in which rubber gauntlet-gloves extending into the tank are fastened for handling different apparatus or the like within the tank.

I claim:

1. A cultivation plant, comprising a tank having a double-jacketed casing with a circular inner sectional area, a removable cover for hermetically closing the tank, two opposite trunnions on the tank having their common axis at a right angle to the axis of said sectional area, two bearings for said trunnions, a gear device for tilting the tank and maintaining the same at a desired angle of inclination during operation, a water circulation system passing through a water supply channel in one of said trunnions to the hollow space within the double-jacketed casing and from said space through a water discharge channel in one of said trunnions, a pump in said circulation system, a heating device in said water circulation system, a control device for maintaining a constant water temperature in said circulation system, a plurality of closed openings including sealing joints into the interior of said casing having each a steam passage separated from the interior of the tank for heating the sealing joints along their circumference, a steam pipe connected with a steam supply channel in one of said trunnions and communicating with branched pipes to said steam passages to the closed openings, and return pipe for condensate and steam from said steam passages to a condensate discharge channel in one of said trunnions.

2. A cultivation plant as claimed in claim 1, wherein said heating device consists of an electric heating element adapted to be switched on and disconnected by means of a contact thermometer.

3. A cultivation plant as claimed in claim 1, comprising a connection pipe between a steam source and the water supply channel, a steam return pipe connected with the water discharge channel, and valves for opening these pipes and closing the water circulation system for sterilizing the interior of the tank.

4. A cultivation plant as claimed in claim 1, wherein the water supply channel and the water discharge channel are provided in the same trunnion, the bearing of which is mounted in a standard containing the circulation pump and the heating device.

5. A cultivation plant as claimed in claim 4, wherein the steam supply channel and the condensate discharge channel are provided in the other trunnion, the bearing of which is mounted in a standard containing an electric steam generator connected with said steam supply channel.

6. A cultivation plant as claimed in claim 1, comprising an air inlet pipe to the tank with entrance openings covered by a filter layer, an air outlet pipe from the tank communicating with a steam-heated chamber, and an air discharge pipe from said chamber.

7. A cultivation plant, comprising a tank having a double-jacketed casing with a circular inner sectional area, a removable cover for hermetically closing the tank, two opposite trunnions on the tank having their common axis at a right angle to the axis of said sectional area, two bearings for said trunnions, a gear device for tilting the tank and maintaining the same at a desired angle of inclination during operation, a water circulation system passing through a water supply channel in one of said trunnions to the hollow space within the double-jacketed casing and from said space through a water discharge channel in one of said trunnions, a pump in said circulation system, a heating device in said water circulation system, a control device for maintaining a constant temperature in said circulation system, an air inlet pipe to the tank, an air outlet pipe from the tank provided with a steam heating device for heating the discharged air, a plurality of closed openings including sealing joints into the interior of said casing having each a steam passage separated from the interior of the tank for heating the sealing joints along their circumference, a steam pipe connected with a steam supply channel in one of said trunnions communicating with branched pipes to said steam passages to the closed openings and with said steam heating device for heating the discharged air, return pipes for condensate and steam to a condensate discharge channel in one of said trunnions, and a rotatable spindle passing from below into the tank and provided with a stirrer for imparting a rotary motion to a culture liquid in the tank.

8. A cultivation plant as claimed in claim 7, wherein the inner wall of the tank forms a surface of revolution and the stirrer spindle is located in the axis of said surface.

9. A cultivation plant as claimed in claim 7, comprising a removable container for a microbe medium secured to the upper end of the stirrer spindle.

10. A cultivation plant as claimed in claim 7, comprising a bearing for the stirrer spindle provided with a ring-shaped channel surrounding the spindle, a steam inlet to said channel, and a condensate outlet from said channel.

11. A cultivation plant as claimed in claim 7, comprising a cooling water tank with pipe connections and valves for circulating cooling water through the pump and the double-jacketed casing.

References Cited in the file of this patent
UNITED STATES PATENTS

| | | |
|---|---|---|
| 2,686,754 | Monod | Aug. 17, 1954 |
| 2,689,818 | Fischer | Sept. 21, 1954 |
| 2,703,304 | Paladino | Mar. 1, 1955 |